ABSTRACT

United States Patent [19]
Vlattas

[11] 3,881,017
[45] Apr. 29, 1975

[54] 9-THIAPROSTAGLANDIN COMPOSITIONS
[75] Inventor: Isidoros Vlattas, Summit, N.J.
[73] Assignee: Ciba-Geigy Corporation, Ardsley, N.Y.
[22] Filed: May 18, 1973
[21] Appl. No.: 361,752

[52] U.S. Cl. ....... 424/275; 260/332.1; 260/332.2 A
[51] Int. Cl............................................. A61k 27/00
[58] Field of Search ... 424/275; 260/332.2 A, 332.1

[56] References Cited
UNITED STATES PATENTS
3,691,202  9/1972  O'Mant.............................. 424/275

*Primary Examiner*—Sam Rosen
*Attorney, Agent, or Firm*—Joseph G. Kolodny; Theodore O. Groeger; John J. Maitner

[57] ABSTRACT

7-[3α-(3-hydroxy-3-hydrocarbylpropyl or -1-propenyl)-4-hydroxy-tetrahydro-2β-thienyl]-heptanoic or 5-heptenoic acids, sulfoxides, sulfones, esters or salts thereof are stable, prostaglandin-like acting agents.

3 Claims, No Drawings

9-THIAPROSTAGLANDIN COMPOSITIONS

SUMMARY OF THE INVENTION

The present invention concerns and has for its object the provision of new 7-[3α-(3-hydroxy-3-hydrocarbylpropyl or -1-propen- or ynyl)-4-hydroxy-tetrahydro-2β-thienyl]-heptanoic or 5-heptenoic acids, more particularly of those corresponding to Formula I

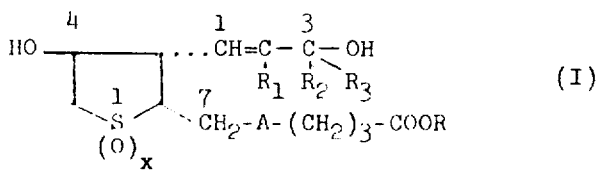

wherein R is hydrogen, one metal equivalent or an aliphatic, cycloaliphatic, araliphatic or aromatic radical, A is ethylene or ethenylene, each of $R_1$ and $R_2$ is hydrogen or lower alkyl, $R_3$ is an aliphatic, cycloaliphatic or araliphatic radical and x is an integer from 0 to 2, or the 1,2-dihydro or -dehydro derivatives thereof, corresponding pharmaceutical compositions and methods for the preparation and application of these products, which are useful prostaglandin-like acting smooth muscle contractants and antiasthmatic agents, but more stable than the easily dehydrating prostaglandins of the E series.

DESCRIPTION OF THE PREFERRED EMBODIMENTS

An aliphatic radical R or $R_3$ represents preferably lower alkyl, as is the case with $R_1$ and $R_2$, e.g. methyl, ethyl, n- or i-propyl, -butyl, -pentyl, -hexyl or -heptyl; lower alkenyl, e.g. allyl or methallyl; or lower alkynyl, e.g. ethynyl or propargyl. The term "lower" referred to above and hereinafter in connection with organic radicals or compounds respectively, defines such with up to 7, preferably up to 4, carbon atoms. $R_3$ also represents higher alkyl, especially such with 8 to 12 carbon atoms, such as n- or i-octyl, -nonyl, -decyl, -undecyl or -dodecyl.

Said lower cycloaliphatic radicals R and $R_3$ are preferably 3 to 7 ring-membered cycloalkyl, cycloalkenyl or (cycloalkyl or cycloalkenyl)-lower alkyl groups, e.g. cyclopropyl, cyclobutyl, cyclopentyl or cyclohexyl; cyclopent-1-enyl or cyclohex-1 or 3-enyl; cyclopropylmethyl, cyclobutylmethyl, 1- or 2-cyclopentylethyl; cyclopent-3-enylmethyl or cyclohex-1-enylmethyl.

Said araliphatic or aromatic radicals R or $R_3$ are preferably isocyclic, monocyclic radicals, such as phenyl-lower alkyl or phenyl groups, unsubstituted or substituted in the aromatic ring by one or more than one, especially one or two, of the same or different substituents, such as lower alkyl, e.g. methyl, ethyl, n- or i-propyl or -butyl; lower alkoxy, e.g. methoxy, ethoxy, N- or i-propoxy or -butoxy; lower alkylenedioxy, e.g. methylenedioxy, 1,1- or 1,2-ethylenedioxy; halogeno, e.g. fluoro, chloro, bromo or iodo; trifluoromethyl; nitro or amino, such as di-lower alkylamino, e.g. dimethylamino or diethylamino. Said aliphatic radicals, especially lower alkyl groups $R_3$, can also be substituted by one of said lower alkoxy groups or one, or up to the maximum number of halogen atoms, as is the case in trifluoromethyl, 2-(methoxy, ethoxy, chloro, bromo or iodo)-ethyl, -propyl or -butyl, 2,2-dichloro-ethyl, -propyl or -butyl, 2,2,2-trichloroethyl, 3-(methoxy, ethoxy, chloro or bromo)-propyl or -butyl, 4-(methoxy or chloro)-butyl.

The compounds of the invention exhibit valuable, prostaglandin-like properties, especially smooth muscle contracting and antiasthmatic activity. This can be demonstrated either in vitro or in vivo tests, using advantageously mammals, such as mice, rats, guinea pigs or dogs as test objects, or isolated organs thereof. The in vitro tests are performed with the guinea pig ileum in a standard organ bath, e.g. physiological saline. The compounds of the invention, when added to said bath in such amounts to reach concentrations down to about $10^{-8}$ molar, contract the isolated ileum. Histamine hydrochloride and prostaglandin $E_1$ are used as a positive standard and the usual experiments include the control for vehicle and buffer effects.

Antiasthmatic activity is estimated in dogs, who are naturally sensitive to ascaris antigens, causing asthma-like syndroms after inhalation of said nebulized antigens. The compounds of the invention are administered intravenously 30–60 minutes after antigen-challenge and efficacy is estimated by the change in respiratory-rate and airway-resistance.

Moreover, anti-fertility effects are tested in rats or hamsters, e.g. by administering the compounds of the invention to pregnant hamsters, for example 2.5 to 10 mg/kg thereof, subcutaneously once on day five of pregnancy, and inspecting on the eleventh day the uterus thereof for implantation sites and surviving embryos. Also smaller doses can be used for intravenous or intrauterine administration, or larger amounts for oral administration, e.g. to spontaneous hypertensive rats, whose blood pressure is monitored by standard means, and is reduced by said compounds.

Accordingly, the compounds of the invention can be applied enterally or parenterally, e.g. by inhalation of a nebulized aqueous solution, or by peroral, subcutaneous, intramuscular, intraveneous or intrauterine administration, in the dosage range known for the natural prostaglandins. According to the test results obtained, they are useful antiasthmatic, hypotensive, abortifacient and luteolytic agents, for example, in the treatment or management of hypertension, especially fertility. They are also valuable intermediates of other preparations, preferably of pharmacologically useful products.

Preferred compounds of the invention are those of Formula I, in which each of R and $R_3$ is lower alkyl, lower alkenyl, lower alkynyl, (3 to 7 ring-membered cycloalkyl or cycloalkenyl)-$C_mH_{2m}$ wherein m is an integer from 0 to 4, or Ph-$C_nH_{2n}$, wherein Ph is phenyl, (lower alkyl)-phenyl, (lower alkoxy)-phenyl, (lower alkylenedioxy)-phenyl, (halogeno)-phenyl, (trifluoromethyl)-phenyl, (nitro)-phenyl or (di-lower alkylamino)-phenyl and n is an integer from 1 to 4, R is also hydrogen, Ph, an alkali metal or one equivalent of an alkaline earth metal and $R_3$ is also (lower alkoxy or halo)-lower alkyl, A is ethylene or ethenylene, $R_1$ and $R_2$ are hydrogen or lower alkyl, or the 1,2-dihydro-derivatives thereof, and x is 0 to 2.

More active and stable are those 3α,4α- and 3β,4β-dihydroxy- compounds of Formula I, wherein R is hydrogen, sodium, potassium, lower alkyl or Ph'-$C_nH_{2n}$ wherein n is an integer from 1 to 4 and Ph' is phenyl, tolyl, anisyl, fluorophenyl or chlorophenyl, A is ethylene or cis-ethenylene, each of $R_1$ and $R_2$ are hydrogen or lower alkyl, and $R_3$ is lower alkyl, lower alkoxyalkyl perfluoro-lower alkyl, (3 to 6 ring-membered cycloalkyl)-$C_mH_{2m}$ or $Ph'-C_nH_{2n}$, wherein m is an integer from 0 to 4, and x is such from 0 to 2.

The highest degree of activity and stability is exhibited by compounds of Formula II

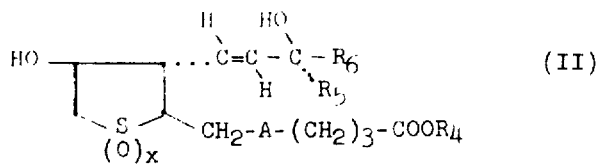

wherein $R_4$ is hydrogen, sodium, potassium or alkyl with up to 4 carbon atoms, A is ethylene or cis-ethenylene, $R_5$ is hydrogen or methyl and $R_6$ is n-pentyl, n-hexyl, n-heptyl, 2-,3- or 4-(cyclopropyl, cyclopentyl or phenyl)-ethyl, -propyl or -butyl and x is 0–2.

Of said compounds of Formula II, it is advantageous to select those wherein $R_4$ is hydrogen, sodium or potassium, A is ethylene or cis-ethenylene, $R_5$ is hydrogen or methyl, x is 0 to 2 and $R_6$ is n-pentyl, n-hexyl or 3-phenylpropyl, due to their outstanding activity and stability.

The compounds of the invention are prepared according to methods known per se, for example by:

a. reducing in a corresponding 7-[3α-(3-oxo-3-hydrocarbylpropyl or 1-propen- or ynyl)-4-hydroxy-tetrahydro-2β-thienyl]-heptan- or 5-enoic acid, or a functional acid- or hydroxy-derivative, the sulfoxide or sulfone thereof, the oxo group to hydroxy or b. oxidizing a corresponding 7-[3α-(3-hydroxy-3-hydrocarbylpropyl or 1-propen- or ynyl)-4-hydroxy-tetrahydro-2β-thienyl]-heptanal or 5-heptenal, or a functional hydroxy-derivative, the sulfoxide or sulfone thereof, to the corresponding acid, or c. reacting the 2β-(6-carboxyhexyl or 2-enyl)-4-hydroxy-tetrahydrothiophene-3α-carboxaldehyde, or a functional acid- or hydroxyderivative, the sulfoxide or sulfone thereof, with the ylid of Formula III

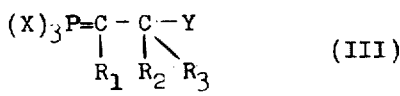

wherein X is lower alkyl or phenyl and Y is metallized or etherified hydroxy or d. reacting a corresponding [3α-(3-hydroxy-3-hydrocarbylpropyl or -1-propen- or ynyl)-4-hydroxy-tetrahydro-2β-thienyl]-acetaldehyde, or a functional hydroxy derivative, the sulfoxide or sulfone thereof, with the compound of Formula IV

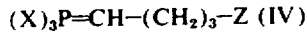

wherein X has the above meaning and Z is functionally converted carboxy, and hydrolyzing any resulting hydroxy derivative in basic or acidic media or any resulting acid amide or nitrile in strong basic media and, if desired, oxidizing resulting compounds with x = 0 to such with x = 1 or 2, or esterifying or salifying any resulting acid or hydrolyzing esters or salts or hydrogenating any resulting dehydro derivative until the desired amount of hydrogen is consumed.

A metallized compound III is preferably derived from an alkali metal, e.g. sodium or potassium, and in a corresponding ether Y is preferably tetrahydropyranyloxy or methoxymethoxy. A functional acid derivative used in the above reactions is preferably a metal salt or an ester, e.g. such mentioned above for the compounds of Formula I, or advantageously the nitrile. A functional hydroxy derivative is either an ester or ether, such as a lower alkanoic acid ester, e.g. the acetate or propionate, but advantageously the 2-tetrahydropyranyl ether.

The reduction according to item a) is advantageously carried out either with simple or complex light metal hydrides, such as borohydrides or alkali metal or zinc boron- or aluminum-hydrides or lower alkoxyhydrides, e.g. lithium aluminumhydride, sodium or zinc borohydride; lithium tri-t-butoxyaluminumhydride or triethoxyaluminumhydride, or according to Meerwein-Ponndorf-Verley with aluminum lower alkoxides, e.g. the ethoxide or advantageously the isopropoxide, preferably in the presence of a lower alkanol, e.g. isopropanol and/or a dihaloaluminum lower alkoxide, e.g. dichloroaluminum isopropoxide.

The oxidation according to item b) is carried out in the conventional manner for oxidizing aldehydes, for example with catalytically activated or nascent oxygen respectively, the latter is derived from conventional oxidation agents, such as oxidizing acids or suitable salts or anhydrides thereof, e.g. periodic acid, sodium hypochlorite, chromic, ferric or cupric halides or sulfates, manganese IV, chromium VI, vanadium V, mercuric or silver oxide, in acidic or alkaline media. Said agents are used in the equivalent amounts and/or under careful condition, in order to prevent oxidations at other sites of the molecule.

The reactions according to items c) and d) are carried out according to the Wittig Reaction, i.e. either with the isolated reactants of Formulae III or IV, or the precursors thereof, e.g. by combining the corresponding phosphonium halide with a strong base, such as an alkali metal hydroxide, alkoxide, alkyl or phenyl compound first, whereupon the aldehyde is added. Reaction c) is followed by acid hydrolysis in order to eliminate Y.

Any resulting hydroxy or carboxy derivative is hydrolyzed in the usual manner, for example a lower alkanoic acid ester of the 3-hydroxy compound, or the amide or nitrile or a lower alkyl ester of the heptanoic acid, with a base, such as an aqueous alkali metal hydroxide or carbonate, or an ether of the 3-hydroxy compound with an acid, such as a mineral, e.g. hydrohalic or sulfuric acid. Any resulting tetrahydrothiophene may be oxidized to the sulfoxide with conventional, mild oxidizing agents such as alkali metal periodates, e.g. sodium periodate. The corresponding sulfones are obtained with stronger oxidation agents, such as hydrogen peroxide or aliphatic or aromatic peracids, e.g. peracetic or m-chloroperbenzoic acid. Any resulting acid may be esterified or salified in the usual manner, for example, with lower alkanols in the presence of mineral acids, preferably with lower diazoalkanes, or corresponding bases or ion exchangers respectively. Any resulting dehydro derivative (e.g. A=ethenylene) can be selectively hydrogenated with rhodium catalysts or diimine. Said hydrogenation is preferably carried out prior to said hydrolysis of the 3-hydroxy derivatives, in order to protect the prop-1-enyl double bond.

The starting material used can be prepared according to the following formula scheme, illustrated by the examples herein:

Accordingly, in case $R_4$ is $A-(CH_2)_3-CN$, compounds of Formula X are starting materials for the reduction mentioned under item a), compounds of Formula IX are starting materials for c) and those of Formula XI such for d). In case $R_4$ in Formula X contains said group capable of being converted into CHO, and such compound is reduced as in a), whereupon CHO is liberd) 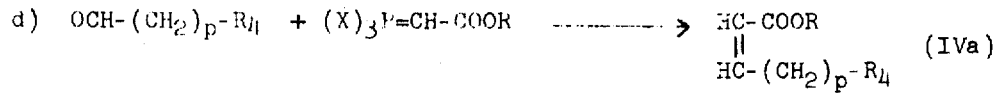

e) 

f) 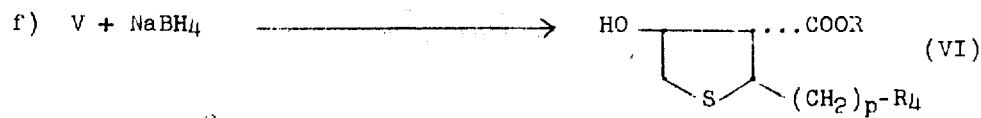

g) 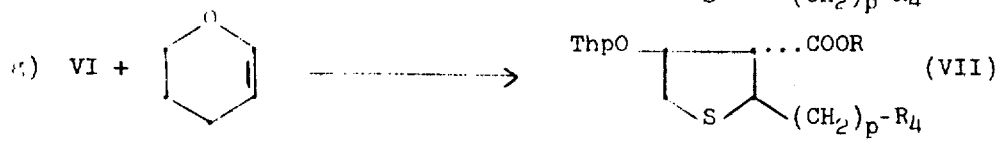

h) 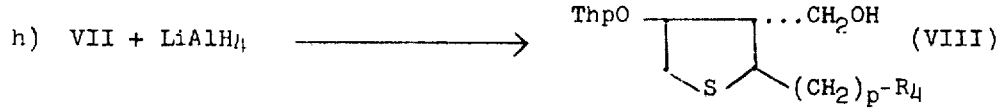

i) 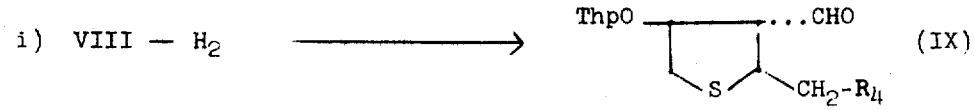

j) 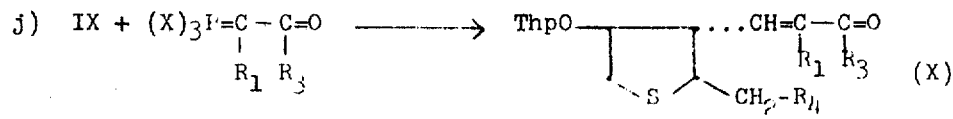

k) 

wherein $R_4$ is either $A-(CH_2)_3-CN$ or a group capable of being converted into CHO, such as an etherified dihydroxymethyl (acetal) group, derived, for example, from lower alkanols or glycols, e.g. methanol, ethanol or ethylene glycol, V is hydrogen, an alkali metal or an ammonium radical derived from a tertiary base, e.g. a trialkylamine or pyridine, and p is the integer 0 or 1.

ated in acidic media, starting material for b) is obtained. Said products can be converted into the other starting materials as described above for the resulting compounds of Formula I.

Another method for the preparation of the starting materials mentioned under item a) to d) is the following:

1) 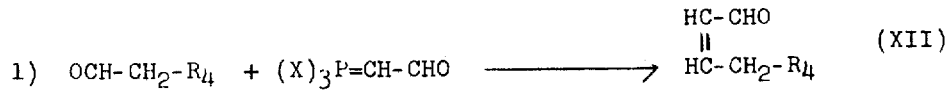

m) 

n) 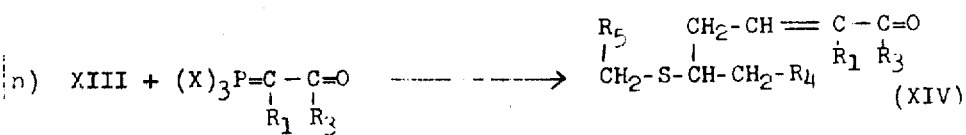

o) XIV + 2HO-(CH$_2$)$_2$-OH 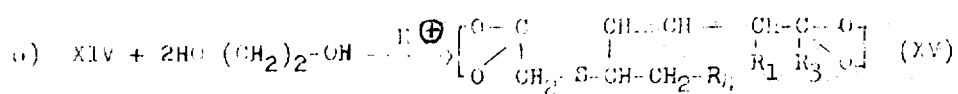

p) XV + 2H$_2$O 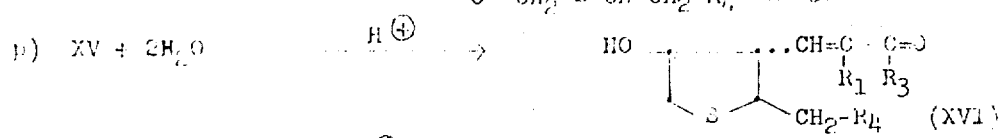

q) XIII + H$_2$O 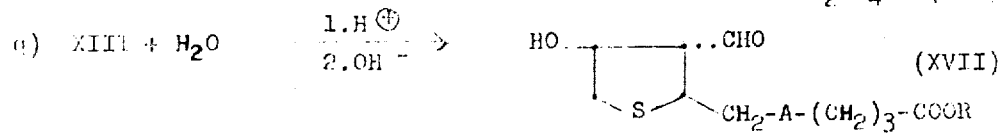

wherein R$_5$ is said group capable of being converted into CHO and the other symbols have the meanings given above. Accordingly, compounds of Formula XVI are starting materials for a) and XVII for c) if R$_4$ is A-(CH$_2$)$_3$-CN. In case R$_4$ in Formulae X and XVI is said group capable of being converted into CHO and such compound is analogously reduced as in a), whereupon CHO is liberated in acidic media, starting material for d) is obtained.

Another process for said starting material is depicted by the following scheme:

r) 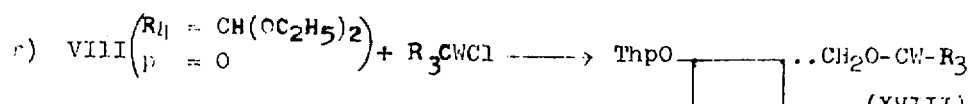

s) 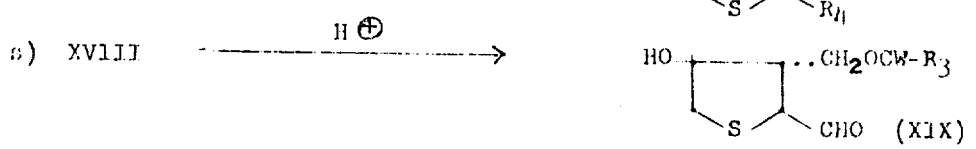

t) 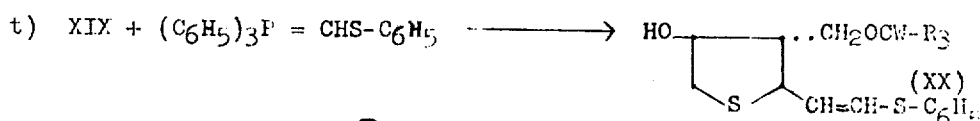

u) 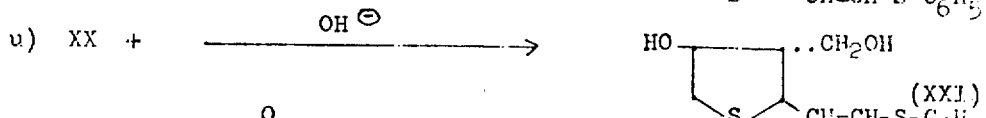

v) 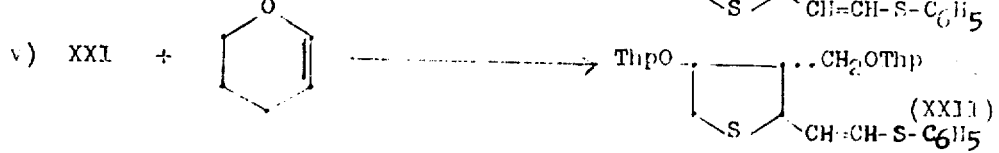

w) 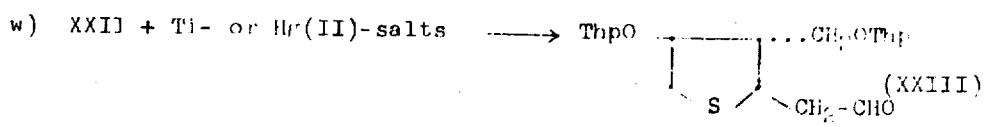

x) 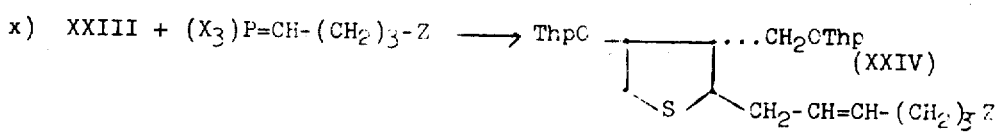

y) 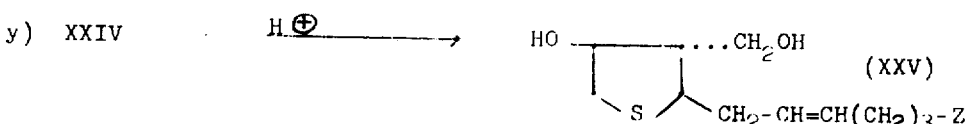

z) 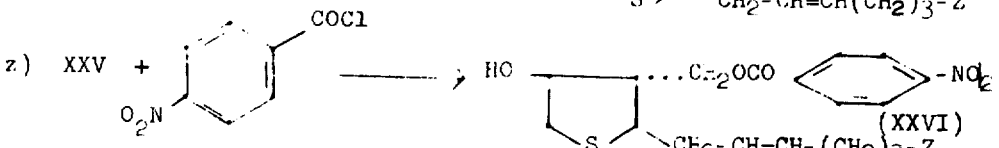

za) 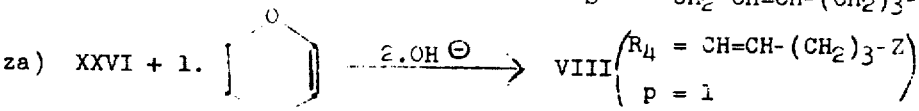

wherein W is $H_2$ or O. The latter VIII is converted to the corresponding X as shown above.

Finally, selected compounds of the invention, or starting materials, can be prepared as follows:

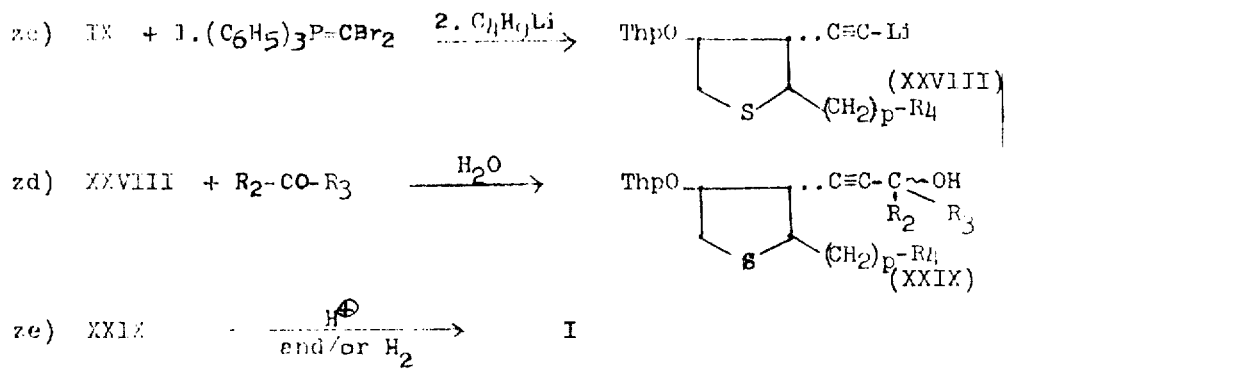

zc) IX + 1. $(C_6H_5)_3P=CBr_2$ 2. $C_4H_9Li$ → ThpO—[ring]—C≡C-Li (XXVIII)

zd) XXVIII + $R_2$-CO-$R_3$ $\xrightarrow{H_2O}$ ThpO—[ring]—C≡C-C(R_2)(R_3)-OH (XXIX)

ze) XXIX $\xrightarrow[\text{and/or } H_2]{H^{\oplus}}$ I

The above steps (d), (j), (k), (l), (n), (s), (t), (u), (x) and (y) are carried out analogous to (c) or (d); the condensations according to (e) or (m) advantageously in di-lower alkylsulfoxides, e.g. dimethylsulfoxide, followed by acid treatment; the reductions according to (f) and (h) are performed analogously to (a); the etherifications, ketalizations or trans-ketalizations according to (g), (o), (v) or (z) respectively are advantageously carried out in the presence of an organic acid, e.g. picric or p-toluenesulfonic acid and an inert diluent, such as a halogenalkane, e.g. methylene chloride; the oxidation according to (i) is performed according to (b), preferably with the use of heavy metal oxides, e.g. silver or chromium VI oxide, advantageously in inert solvents, such as halogenalkanes and/or pyridine. The ring-closure according to (p) occurs spontaneously after acid hydrolysis of the bis-ketal whereas that according to (q) requires first acid hydrolysis to convert $R_5$ to formyl and the following aldol condensation occurs under basic conditions, e.g. in the presence of alkali metals, their alkoxides or amides. The esterification or benzylation according to (r) and (z) are carried out in the usual manner, preferably in the presence of a base, e.g. pyridine, or sodium hydride respectively. Said intermediates, e.g. VIII, can also be oxidized to the sulfoxides or sulfones, as shown above for compounds I.

Resulting mixtures of isomers can be separated into the single isomers by methods in themselves known, e.g. by fractional distillation, crystallization and/or chromatography. Racemic products can likewise be resolved into the optical antipodes, for example, by separation of diastereomeric esters or salts thereof, e.g. by the fractional crystallization of d- or l-2-pyrrolidone-3-carboxylates, -3β-acetoxy-Δ⁵-etienates, -α-(2,4,5,7-tetranitro-9-fluorenylideneaminooxy)-propionates or salts of d- or l-α-phenethylamine, -1-phenyl-2-propylamine or -dihydroabietylamine.

The above reactions are carried out according to standard methods, in the presence or absence of diluents, preferably such as are inert to the reagents and are solvents thereof, of catalysts, condensing, neutralizing agents and/or inert atmospheres, at low temperatures, room temperature or elevated temperatures, at atmospheric or superatmospheric pressure. For example, any generated mineral or sulfonic acid may be neutralized with inorganic or organic bases, such as alkali or alkaline earth metal hydroxides, carbonates or bicarbonates or nitrogen bases, such as tri-lower alkylamines or pyridine.

The invention also comprises any modification of the above process, wherein a compound resulting as an intermediate at any stage thereof, is used as starting material and the remaining steps are carried out or the process is discontinued at any stage thereof, or in which the starting material is formed under the reaction conditions or is used in the form of its salts or other derivatives. In the above processes, those starting materials are advantageously selected, which yield the above-described preferred embodiments of the invention.

The pharmacologically active compounds of the invention are useful in the manufacture of pharmaceutical compositions containing an effective amount thereof in conjunction or admixture with excipients suitable for either enteral or parenteral application. Preferred are tablets and gelatin capsules comprising the active ingredient together with (a) diluents, e.g. lactose, dextrose, sucrose, mannitol, sorbitol, cellulose and/or glycine, b) lubricants, e.g. silica, talcum, stearic acid, its magnesium or calcium salt and/or polyethyleneglycol, for tablets also (c) binders, e.g. magnesium aluminum silicate, starch paste, gelatin, tragacanth, methylcellulose, sodium carboxymethylcellulose and/or polyvinylpyrrolidone, if desired, (d) disintegrants, e.g. starches, agar, alginic acid or its sodium salt, enzymes of the binders or effervescent mixtures and/or (e) adsorbents, colorants, flavors, sweeteners and coating agents, e.g. concentrated aqueous sugar solutions containing gum arabic, talcum and/or titanium dioxide, or solutions of lacquers in easily volatile organic solvents, in order to obtain regular or sustained release formulations. Injectable compositions are preferably aqueous isotonic solutions or suspensions, and suppositories are advantageously fatty emulsions or suspensions, e.g. in cocoa butter. They may be sterilized and/or contain adjuvants, such as preserving, stabilizing, wetting or emulsifying agents, solution promoters, salts for regulating the osmotic pressure and/or buffers. They may also contain other therapeutic agents, e.g. diuretics and/or psychotherapeutics as in U.S. Pat. Nos. 3,081,230 or 3,499,082. Said compositions are prepared according to conventional mixing, granulating or coating methods respectively and contain about 0.001 to 75 percent, preferably about 1 to 50 percent of the active ingredient.

The following examples are intended to illustrate the invention and are not to be construed as being limitations thereon. Temperatures are given in degrees Centigrade, and all parts wherever given are parts by weight. If not otherwise stated, all evaporations are carried out under reduced pressure, the infrared spectra are obtained from about 1–5 percent solutions in chloroform and the N.M.R. spectra from about 10 percent solutions in deuterochloroform at 60 Mc/sec. with tetramethylsilane as zero.

EXAMPLE 1

To the solution of 53 mg of 7-[3α-(3-oxo-1-trans-octenyl)-4β-hydroxy-tetrahydro-2β-thienyl]-heptanoic acid nitrile in 1 ml of diethyl ether, 3 ml of ethereal zinc borohydride [prepared according to Gensler et al, J. Am. Chem. Soc. 82, 6074 (1960)] are added at once and the mixture is stirred at room temperature for two hours. Thereupon 0.1 ml of water are added, followed by 0.1 ml of glacial acetic acid and the mixture is stirred for five minutes. It is diluted with 50 ml of diethyl ether, washed with saturated aqueous sodium chloride, dried and evaporated. The residue is subjected to preparative thin-layer chromatography on silica gel plates (1 mm thick), eluted with ethyl acetate-methylene chloride (1:1) and of the two main fractions the slower moving isomer with Rf = 0.26 isolated, to yield the 7-[3α-(3β-hydroxy-1-trans-octenyl)-4β-hydroxy-tetrahydro-2β-thienyl]-heptanoic acid nitrile of the formula

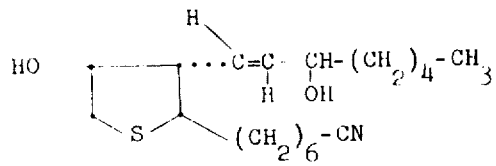

melting at 67°–69° after recrystallization from diethyl ether-n-hexane.

The mixture of 69 mg thereof, 2 ml of methanol, 1 ml of water and 0.2 ml of 20 percent aqueous potassium hydroxide is heated in a sealed tube to 115°–120° for 72 hours and evaporated. The residue is taken up in 10 ml of water and 10 ml of saturated aqueous sodium chloride, the mixture neutralized with dry ice and extracted with diethyl ether. The extract is dried, evaporated and the residue recrystallized from diethyl ether, to yield the 7-[3α-(3β-hydroxy-1-trans-octenyl)-4β-hydroxy-tetrahydro-2β-thienyl]-heptanoic acid of the formula

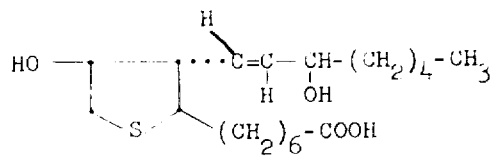

melting at 88°–90°.

The starting material is prepared as follows: The mixture of 1.8 g of 9-cyano-2-nonenal, 1.4 g of 2,2-diethoxy-ethanethiol and 50 μl of triethylamine is allowed to stand at room temperature for 48 hours. It is taken up in 100 ml of diethyl ether, the solution washed with water, dried and evaporated, to yield the 9-cyano-3-(2,2-diethoxy-ethylmercapto)-nonenal, showing in NMR spectrum peaks at 9.78, 4.55, 3.57 and 2.61 ppm.

To the solution of 2.6 thereof in 10 ml of diethyl ether, 3 g of 1-tri-n-butylphosphoranilidene-2-heptanone are added while stirring and the mixture is allowed to stand at room temperature overnight. It is evaporated, the residue subjected to preparative thin-layer chromatography on silica gel and twice eluted with ethyl acetate-methylene chloride (1:99), to yield the 16-cyano-10-(2,2-diethoxyethyl-mercapto)-8-hexadecene-6-one of the formula

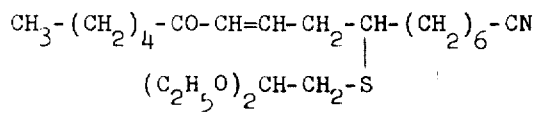

having an Rf = 0.33.

The mixture of 1.2 g thereof, 0.34 g of ethylene glycol, 30 mg of p-toluenesulfonic acid and 25 ml of benzene is refluxed for 15 hours on a water separator. After cooling it is diluted with 100 ml of diethyl ether, the solution washed with 10 percent aqueous potassium bicarbonate and water, dried and evaporated, to yield the bis-ethylene ketal of the 1-cyano-10-formylmethylmercapto-8-hexadecen-6-one showing in the NMR spectrum peaks at 5.4, 5.02, 3.93, 2.66 and 2.34 ppm.

The mixture of 1.15 g thereof, 30 ml of acetone and 0.19 g of p-toluenesulfonic acid is stirred for 40 hours at room temperature under nitrogen. It is evaporated at room temperature, the residue taken up in diethyl ether, the solution washed with 10% aqueous potassium carbonate and water, dried and evaporated. The residue is subjected to preparative thin-layer chromatography on silica gel, eluted three times with ethyl acetate-methylene chloride (9:1) and the two main fractions having Rf = 0.70 and 0.55 are isolated. The slower moving isomer (Rf = 0.55) is the desired 7-[3α-(3-oxo-1-trans-octenyl)-4β-hydroxy-tetrahydro-2β-thienyl]-heptanoic acid nitrile, showing in the mass spectrum fragments of 337, 319, 262, 220 and 209 m/e.

The faster moving isomer is the corresponding 2β, 3α, 4α-compound. It can be reduced and hydrolized as shown above, to yield the 7-[3α-(3α-hydroxy-1-trans-octenyl)-4α-hydroxy-tetrahydro-2β-thienyl]-heptanoic acid of the formula

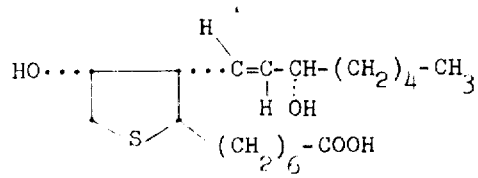

melting at 103°–104°.

EXAMPLE 2

The mixture of 58 mg of 7-[3α-(3β-hydroxy-1-transoctenyl)-4β-hydroxy-tetrahydro-2β-thienyl]-heptanoic acid, 3 ml of dioxane, 1 ml of water, 4 ml of methanol and 52 mg of sodium periodate is stirred at 0° for 24 hours and evaporated at room temperature. The residue is taken up in saturated aqueous sodium chloride, the mixture extracted four times with ethyl acetate-diethyl ether (1:1), the extract dried and evaporated. The residue is subjected to preparative thin-layer chromatography on silica gel and eluted with the less polar phase obtained from ethyl acetate-acetic acidmethanol-hexane-water (110:30:35:100), to yield the corresponding α- and β-sulfoxides of the formula

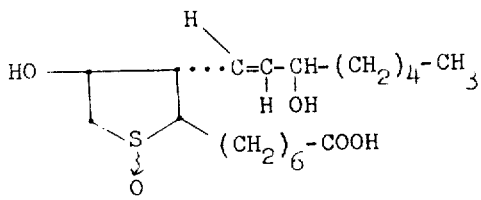

having Rf = 0.41 or m.p. 110°–125° and Rf = 0.50 or m.p. 110°–118° respectively.

In the analogous manner the 7-[1α and β-oxo-3α-(3α-hydroxy-1-trans-octenyl)-4α-hydroxy-tetrahydro-2β-thienyl]-heptanoic acids are obtained, having Rf = 0.38 or m.p. 105°–120° and Rf = 0.49 or m.p. 96°–103° respectively.

EXAMPLE 3

To the solution of 45 mg of 7-[1,1-dioxo-[3α-(3-oxo-1-trans-octenyl)-4β-(2-tetrahydropyranyloxy)-tetrahydro-2β-thienyl]-heptanoic acid methyl ester in 3 ml of dioxane-methanol (1:1), 50 mg of sodium borohydride are added and the mixture stirred for half hour at room temperature. It is diluted with 20 ml of diethyl ether, washed with water and saturated aqueous sodium chloride, dried and evaporated. The residue is dissolved in 2 ml of methanol and 50 μl of 2N sulfuric acid while stirring and the mixture is allowed to stand at room temperature overnight. It is diluted with 20 ml of diethyl ether, washed with water and saturated aqueous sodium chloride, dried and evaporated. The residue is subjected to preparative thin-layer chromatography on silica gel and eluted twice with ethyl acetate-methylene chloride (3:2), to yield the 7-[1,1-dioxo-3α-(3β-hydroxy-1-trans-octenyl)-4β-hydroxy-tetrahydro-2β-thienyl]-heptanoic acid methyl ester of the formula

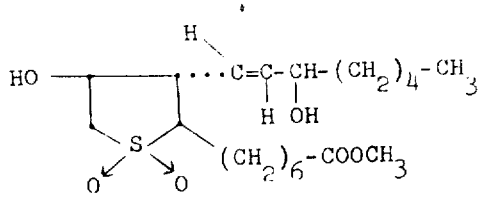

having Rf = 0.18 or m.p. 88°–90°.

The mixture of 48 mg thereof, 1 ml of methanol and 0.2 ml of 2N aqueous sodium hydroxide is allowed to stand at room temperature overnight and evaporated. The residue is taken up in 1 ml of water and 2 ml of saturated aqueous sodium chloride, the mixture acidified with 2N sulfuric acid and extracted with diethyl ether. The extract is washed with water and saturated aqueous sodium chloride, dried and evaporated, to yield the corresponding free acid melting at 87°–89°.

The starting material is prepared as follows: The mixture of 14 g of 7-cyanoheptanal, 38 g of ethyl triphenylphosphoranylidene-acetate and 100 ml of benzene is refluxed for 15 hours and evaporated. The residue is triturated with diethyl ether, filtered and the filtrate evaporated. The residue is allowed to stand overnight in the refrigerator, triturated with the minimum amount of diethyl ether, the suspension filtered, the filtrate evaporated, the residue distilled and the fraction boiling at 130°–138°/0.1 mm Hg collected, to yield the 9-cyano-2-nonenoic acid ethyl ester of the formula

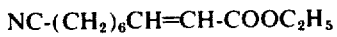

NC-(CH$_2$)$_6$CH=CH-COOC$_2$H$_5$ 27.4 g thereof are added at once at 10° to the mixture prepared from 2.99 g of pulverized sodium, 125 ml of ethanol and 15.6 g of ethyl thioglycolate, evaporating the mixture after stirring it at room temperature and adding 100 ml of dimethylsulfoxide. The mixture is stirred at 10° for 1/2 hour and at room temperature for 2 hours, poured into 100 ml of cold 2N hydrochloric acid and extracted with diethyl ether. The extract is washed with water, dried and evaporated, to yield the 2-(6-cyanohexyl)-4-oxo-tetrahydrothiophen-3-carboxylic acid ethyl ester of the formula

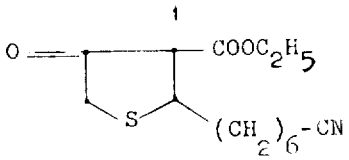

which is used as such without further purification.

To the solution of 24 g thereof in 240 ml of ethanol, 1.8 g of sodium borohydride are added during 5 minutes while stirring at 0°. After ½ hour, the mixture is poured onto ice water, extracted with diethyl ether, the extract washed with water and saturated aqueous sodium chloride, dried and evaporated. Each gram of the residue is chromatographed on 30 g of silica gel and the column eluted with ethyl acetate-methylene chloride (1:1), to yield the 2-(6-cyanohexyl)-4-hydroxy-tetrahydrothiophen-3-carboxylic acid ethyl ester of the formula

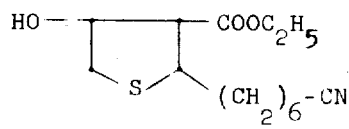

having the correct elemental analysis.

The mixture of 900 mg thereof, 538 mg of dihydropyrane, 45 mg of picric acid and 10 ml of methylene chloride is allowed to stand at room temperature overnight. It is evaporated, the residue taken up in diethyl ether, the solution washed three times with 10 percent aqueous potassium bicarbonate, once with water and saturated aqueous sodium chloride, dried and evaporated, to yield the 2-(6-cyanohexyl)-4-(2-tetrahydropyranyloxy)-tetrahydrothiophen-3-carboxylic acid ethyl ester of the formula

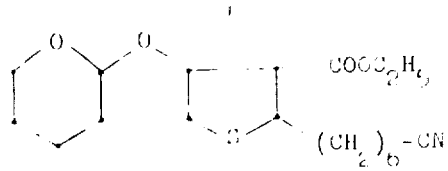

showing in the I.R. spectrum bands at 2931, 2855, 2254 and 1730 cm⁻¹.

To the solution of 5.015 g thereof in 200 ml of tetrahydrofuran, 900 mg of lithium aluminum hydride are added while stirring at −20°. After 3 hours, 200 ml of diethyl ether are added, followed by a few drops of methanol and water. It is filtered, the filtrate evaporated, the residue subjected to preparative thin-layer chromatography on silica gel and eluted twice with ethyl acetate-methylene chloride (1:9), to yield the 7-[3α-hydroxymethyl-4β-(2-tetrahydropyranyloxy)-tetrahydro-2β-thienyl]-heptanoic acid nitrile of the formula

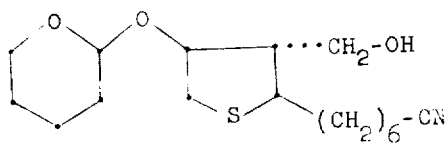

showing in the I.R. spectrum bands at 3500, 2930, 2855 and none at 1730 cm⁻¹.

The mixture of 1.3 g thereof, 10 ml of methanol, 5 ml of water and 2 ml of 20 percent aqueous potassium hydroxide is heated in a sealed tube to 115°–120° for 72 hours. It is evaporated, the residue taken up in 10 ml of water and 10 ml of saturated aqueous sodium chloride, the solution neutralized with dry ice and extracted with diethyl ether. The extract is dried, evaporated, the residue taken up in an excess of ethereal diazomethane and the solution evaporated after ½ hour, to yield the 7-[3α-hydroxymethyl-4β-(2-tetrahydropyranyloxy)-tetrahydro-2β-thienyl]-heptanoic acid methyl ester of the formula

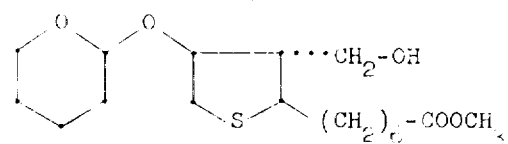

showing in the I.R. spectrum bands at 2930, 2855 and 1735 cm⁻¹.

To the solution of 1.2 g thereof in 60 ml of methylene chloride, 1.1 g of m-chloroperbenzoic acid are added while stirring at −15° and stirring is continued at room temperature for 48 hours. The mixture is neutralized with gaseous ammonia, filtered and evaporated, to yield the 7-[1,1-dioxo-3α-hydroxymethyl-4β-(2-tetrahydropyranyloxy)-tetrahydro-2β-thienyl]-heptanoic acid methyl ester of the formula

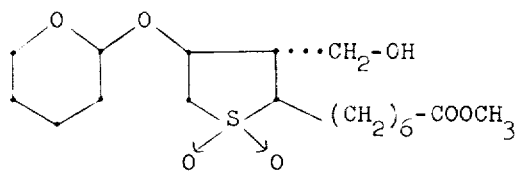

showing in the I.R. spectrum bands at 3455, 1720, 1100, 1060 and 1020 cm⁻¹.

To the solution of 400 mg thereof in 200 ml of methylene chloride, the solution of 1.6 g of pyridine-chromium trioxide complex are added at once and the mixture stirred at room temperature for 15 minutes. It is washed with water, dried, treated with charcoal, filtered and evaporated. The residue is taken up in 20 ml of diethyl ether, and 1.6 g of 1-tri-n-butylphosphoranylidene-2-heptanone are added while stirring and the mixture allowed to stand at room temperature overnight. It is evaporated, the residue subjected to preparative thin-layer chromatography on silica gel and eluted with ethyl acetate-methylene chloride (1:9) to yield the desired 7-[1,1-dioxo-3α-(3-oxo-1-trans-octenyl)-4β-(2-tetrahydropyranyloxy)-tetrahydro-2β-thienyl]-heptanoic acid methyl ester showing in the N.M.R. spectrum peaks at 6.92, 6.79, 6.59, 6.32, 4.72 and 3.55 ppm.

EXAMPLE 4

To the solution of 400 mg 7-[3α-(3-oxo-1-trans-octenyl)-4β-(2-tetrahydropyranyloxy)-tetrahydro-2β-thienyl]-heptanoic acid methyl ester in 20 ml of ethanol, 100 mg of sodium borohydride are added and the mixture stirred for half hour at 0°. It is diluted with 200 ml of diethyl ether, washed with water and saturated aqueous sodium chloride, dried and evaporated. The residue is dissolved in 20 ml of methanol, 10 mg of p-toluenesulfonic acid are added while strrring and the mixture is allowed to stand at room temperature overnight. It is diluted with 200 ml of diethyl ether, washed with water and saturated aqueous sodium chloride, dried and evaporated. The residue is subjected to preparative thin-layer chromatography on silica gel and eluted with ethyl acetate-methylene chloride (1:1), to yield the 7-[3α-(3β-hydroxy-1-trans-octenyl)-4β-hydroxy-tetrahydro-2β-thienyl]-heptanoic acid methyl ester of the formula

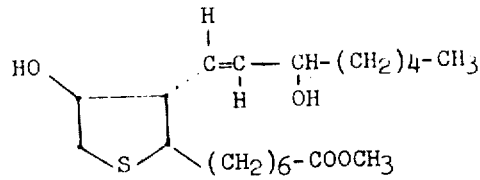

having an Rf = 0.302 and showing in the NMR spectrum bands at 5.5, 3.67, 2.28 and 0.90 ppm.

The mixture of 82 mg thereof, 10 ml of methanol and 1 ml of 0.1N aqueous sodium hydroxide is allowed to stand at room temperature overnight and evaporated. The residue is taken up in 10 ml of water and 10 ml of saturated aqueous sodium chloride, the mixture acidified with 0.1N hydrochloric acid and extracted with diethyl ether. The extract is washed with water and saturated aqueous sodium chloride, dried and evaporated, to yield the corresponding free acid, which is identical with the compound obtained according to Example I.

The starting material is prepared as follows: The solution of 1.1 g of 7-[3α-hydroxymethyl-4β-(2-tetrahydropyranyloxy)-tetrahydro-2β-thienyl]-heptanoic acid methyl ester in 5 ml of dry toluene is added dropwise to the mixture, prepared by adding 0.6 ml of dimethylsulfide to a solution of 0.8 g of N-chlorosuccimmide in 25 ml of toluene at 0°, while stirring at −25°. After two hours 0.84 ml of triethylamine are added, cooling is discontinued and after five minutes 20 ml of diethyl ether are added. The mixture is washed with water, 0.1N hydrochloric acid and saturated aqueous sodium chloride, dried and evaporated, to yield the 7-[3α-formyl-4β-(2-tetrahydropyranyloxy)-tetrahydro-2β-thienyl]- heptanoic acid methyl ester, having an Rf = 0.64 on silica gel plates eluted with ethyl acetate-methylene chloride (1:4).

The mixture of 1.1 g thereof, 1.1 g of 1-tri-n-butyl phosphoranylidene-2-heptanone and 20 ml of diethyl ether is stirred at room temperature overnight and evaporated. The residue is subjected to preparative thin-layer chromatography on silica gel plates (1 mm thick), eluted with ethyl acetate-methylene chloride (1:1) and the band corresponding to Rf = 0.534 yields the 7-[3α-(3-oxo-1-trans-octenyl)-4β-(2-tetrahydropyranyloxy)-tetrahydro-2β-thienyl]-heptanoic acid methyl ester.

EXAMPLE 5

To the solution of 200 mg of 7-[1,1-dioxo-3α-(3-oxo-1-trans-octenyl)-4β-(2-tetrahydropyranyloxy)-tetrahydro-2β-thienyl]-heptanoic acid methyl ester in 25 ml of tetrahydrofurane, cooled to −78°, 6 ml of 1-molar methylmagnesium iodide solution in diethyl ether are added dropwise while stirring. After one hour the mixture is diluted with wet diethyl ether, washed with water, dried and evaporated. The residue is dissolved in 8 ml of methanol, 40 mg of p-toluenesulfonic acid are added and the mixture is kept at 5°C overnight. It is neutralized with triethylamine, evaporated and the residue taken up in diethyl ether. The solution is washed with water, dried, evaporated and the residue crystallized from diethyl ether, to yield the 7-[1,1-dioxo-3α-(3β-hydroxy-3α-methyl-1-trans-octenyl]-4β-hydroxy-tetrahydro-2β-thienyl]-heptanoic acid methyl ester melting at 74.77°.

The mixture of 36 mg thereof, 0.5 ml of methanol and 50 μl of 20 percent aqueous potassium hydroxide is stirred at room temperature overnight and evaporated. The residue is dissolved in 4 ml of water and 1 ml of saturated aqueous sodium chloride, then neutralized by adding dry-ice and extracted six times with diethyl ether. The combined extracts are washed with water, dried and evaporated to yield the 7-[1,1-dioxo-3α-(3β-hydroxy-3α-methyl-1-trans-octenyl)-4β-hydroxy-tetrahydro-2β-thienyl]-heptanoic acid of the formula

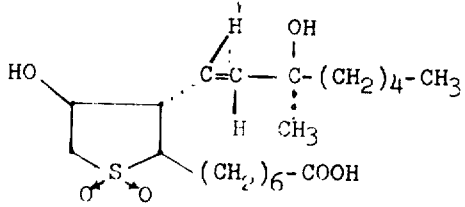

melting at 122°–123°.

EXAMPLE 6

To the solution of 400 mg of 7-[1,1-dioxo-3α-(3-oxo-1-trans-5-phenylpentenyl)-4β-(2-tetrahydropyranyloxy)-tetrahydro-2β-thienyl]-heptanoic acid methyl ester in 30 ml of ethanol, 87 mg of sodium borohydride are added and the mixture stirred for half hour at room temperature. It is diluted with 200 ml of diethyl ether, washed with water and saturated aqueous sodium chloride, dried and evaporated. The residue is dissolved in 20 ml of methanol, 10 mg of p-toluenesulfonic acid are added while stirring and the mixture is allowed to stand at room temperature overnight. It is diluted with 200 ml of diethyl ether, washed with water and saturated aqueous sodium chloride, dried and evaporated. The residue is subjected to preparative thin-layer chromatography on silica gel and eluted twice with ethyl acetate-methylene chloride (4:1), to yield the 7-[1,1-dioxo-3α-(3β-hydroxy-1-trans-5-phenylpentenyl)-4β-hydroxy-tetrahydro-2β-thienyl]-heptanoic acid methyl ester of the formula

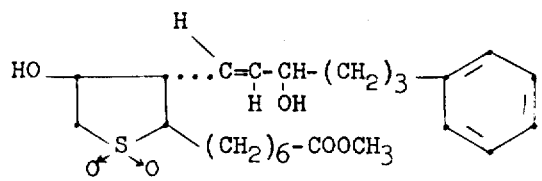

having Rf = 0.29 or m.p. 63°–65°.

The mixture of 148 mg thereof, 9 ml of methanol and 1.2 ml of 2N aqueous sodium hydroxide is allowed to stand at room temperature overnight and evaporated. The residue is taken up in 10 ml of water and 20 ml of saturated aqueous sodium chloride, the mixture acidified with 2N sulfuric acid and extracted with diethyl ether. The extract is washed with water and saturated aqueous sodium chloride, dried and evaporated, to yield the corresponding free acid melting at 122°–124°.

The starting material is prepared as follows: To the solution of 500 mg of 7-[1,1-dioxo-3α-hydroxymethyl-4β-(2-tetrahydropyranyloxy)-tetrahydro-2β-thienyl]-heptanoic acid methyl ester in 200 ml of methylene chloride, the solution of 2.01 g of pyridinechromium trioxide complex are added at once and the mixture stirred at room temperature for 15 minutes. It is washed with water, dried, treated with charcoal, filtered and evaporated. The residue is taken up in 20 ml of diethyl ether, and 725 mg of 1-tri-n-butylphosphoranylidene-5-phenyl-2-pentanone are added while stirring and the mixture allowed to stand at room temperature overnight. It is evaporated, the residue subjected to preparative thin-layer chromatography on silica gel and eluted with ethyl acetate-methylene chloride (35:65), to yield the 7-[1,1-dioxo-3α-(3-oxo-1-trans-5-phenylpentenyl)-4β-(2-tetrahydropyranyloxy)-tetrahydro-2β-thienyl]-heptanoic acid methyl ester showing in the NMR spectrum peaks at 7.22, 6.36, 6.1, 5.67, 1.58 and 1.38 ppm.

EXAMPLE 7

The solution of 100 mg of 7-[1,1-dioxo-3α-(3β-hydroxy-1-trans-octenyl)-4β-hydroxy-tetrahydro-2β-thienyl]-heptanoic acid in 5 ml of diethyl ether is treated with excess of ethereal diazomethane at 0° for ½ hour and the solution evaporated under reduced pressure, to yield the corresponding methyl ester melting at 88° to 90° after recrystallization from ethyl acetate-methylene chloride (3:2).

In a similar manner the methyl esters of the acids illustrated by the previous examples are prepared.

EXAMPLE 8

50 mg of 7-[1,1-dioxo-3α-(3β-hydroxy-1-trans-octenyl)-4β-hydroxy-tetrahydro-2β-thienyl]-heptanoic acid are hydrogenated overnight in 10 ml of ethanol over 10 mg of tris-(triphenylphosphine)-rhodium (I) chloride at room temperature and atmospheric pressure. The catalyst is filtered off, the filtrate evaporated, the residue taken up in diethyl ether and the solution decolorized with charcoal, to yield the 7-[1,1-dioxo-3α-(3β-hydroxyoctyl)-4β-hydroxy-tetrahydro-2β-thienyl]-heptanoic acid of the formula

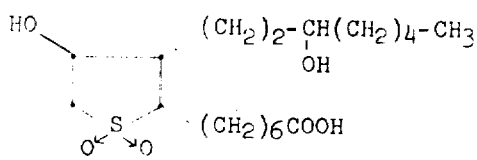

Analogously the unsaturated compounds of the remaining examples can be hydrogenated to the corresponding saturated compounds.

EXAMPLE 9

Analogous to the methods illustrated in the previous examples the following compounds of the formula

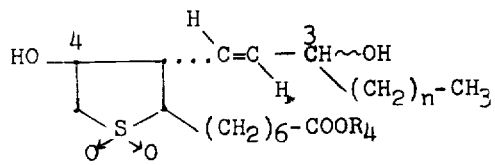

are prepared from equivalent amounts of the corresponding starting materials:

| No. | 3-OH | n | $R_4=CH_3$ Rf | $R_4=H$ m.p. |
|---|---|---|---|---|
| 1 | α | 5 | 0.375A | 121–122°B |
| 2 | β | 5 | 0.22A | 100–102°B |
| 3 | α | 6 | 0.38A | 123–125°C |
| 4 | β | 6 | 0.225A | 114–116°C |
| 5 | α | 7 | 0.359D | 79–81°B |
| 6 | β | 7 | 0.250D | 101–104°B |

A = ethyl acetate - methylene chloride (1:1)
B = diethyl ether - methylene chloride
C = diethyl ether - methanol-hexane
D = ethyl acetate - methylene chloride (4:1)

EXAMPLE 10

Preparation of injection ampuls each containing 50 mg of the active ingredient:

Formula:

| | |
|---|---|
| 7-[1,1-dioxo-3α-(3β-hydroxy-1-trans-octenyl)-4β-hydroxy-tetrahydro-2β-thienyl]-heptanoic acid | 170 g |
| 1,1,1-Trichloro-2-methyl-2-propanol | 85 g |
| Polysorbate 80 | 85 g |
| Methylcellulose 100 cps | 1,785 g |
| Sodium carboxymethylcellulose 70 MV | 51 g |
| Sodium chloride | 136 g |
| Water for injection | 17 lt. |

PROCEDURE

The chloropropanol is first dissolved in 13 lt of water at 90°, then the sodium carboxymethylcellulose is added while stirring, followed by the methylcellulose and stirring is continued for 15 minutes. The mixture is allowed to stand at 10° for 12 hours, combined with the polysorbate and the solution of the sodium chloride and active ingredient in 250 ml of water each. The resulting solution is made up to 17 lt with water, filtered through a sintered glass funnel, the filtrate placed into 2 lt sterilized bottles, steam-sterilized at 100° for 3.25 hours and filled into 5 ml ampuls with standard equipment.

This injectable solution ($10^{-2}$ g/ml) can be used in the preparation of an infusion solution, by adding the proper amount thereof to infusion saline, to obtain a solution containing 10 ug of the active ingredient per ml ($10^{-5}$ g/ml).

In the analogous manner injection- or infusion- solutions are prepared with the remaining compounds of the invention, especially those illustrated by the previous examples.

I claim:

1. A pharmaceutical composition comprising a compound, corresponding to the formula

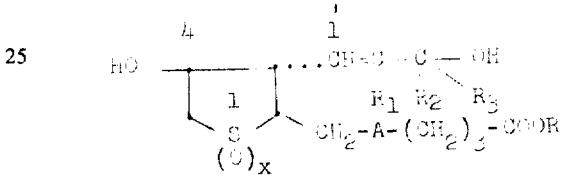

wherein each of R and $R_3$ is lower alkyl, lower alkenyl, lower alkynyl, (3 to 7 ring-membered cycloalkyl or cycloalkenyl)-$C_mH_{2m}$ wherein m is an integer from 0 to 4, or Ph-$C_nH_{2n}$, wherein Ph is phenyl, (lower alkyl)-phenyl, (lower alkoxy)-phenyl, (lower alkylenedioxy)-phenyl, (halogeno)-phenyl, (trifluoromethyl)-phenyl, (nitro)-phenyl or (di-lower alkylamino)-phenyl, n is an integer from 1 to 4 and x such from 0 to 2, or R is also hydrogen, Ph, an alkali metal or one equivalent of an alkaline earth metal and $R_3$ is also (lower alkoxy or halo)-lower alkyl, A is ethylene or ethenylene, $R_1$ and $R_2$ are hydrogen or lower alkyl, or the 1,2-dihydroderivatives thereof containing no double-bond at the 1-chain-carbon atom, in an amount sufficient to produce a prostaglandin-like effect together with a pharmaceutical excipient.

2. A composition as claimed in claim 1, wherein the effective compound corresponds to the formula

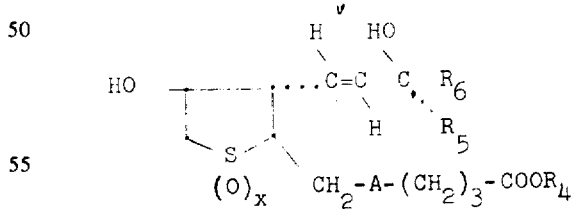

wherein $R_4$ is hydrogen, sodium, potassium or alkyl with up to 4 carbon atoms, A is ethylene or cis-ethenylene, $R_5$ is hydrogen or methyl, $R_6$ is n-pentyl, n-hexyl, n-heptyl, 2-, 3- or 4-(cyclopropyl, cyclopentyl or phenyl)-ethyl, -propyl or -butyl and x is an integer from 0 to 2.

3. A composition as claimed in claim 1, wherein the effective compound is 7-[1,1-dioxo-3α-(3β-hydroxy-1-trans-octenyl)-4β-hydroxy-tetrahydro-2β-thienyl]-heptanoic acid.

* * * * *